(12) United States Patent
Tanaami

(10) Patent No.: US 6,185,036 B1
(45) Date of Patent: Feb. 6, 2001

(54) CONFOCAL SYSTEM

(75) Inventor: Takeo Tanaami, Tokyo (JP)

(73) Assignee: Yokogawa Electric Corporation, Tokyo (JP)

(*) Notice: Under 35 U.S.C. 154(b), the term of this patent shall be extended for 0 days.

(21) Appl. No.: 09/263,055

(22) Filed: Mar. 6, 1999

(30) Foreign Application Priority Data

Mar. 17, 1998 (JP) .................................................. 10-066751

(51) Int. Cl.$^7$ .................................................. G02B 21/00
(52) U.S. Cl. .......................... 359/368; 359/235; 359/389; 356/376
(58) Field of Search .................................... 359/232, 234, 359/235, 236, 368, 371, 385, 386, 389; 356/376

(56) References Cited

U.S. PATENT DOCUMENTS

| | | | |
|---|---|---|---|
| 4,806,004 | * 2/1989 | Wayland | 359/389 |
| 5,225,671 | * 7/1993 | Fukuyama | 250/216 |
| 5,248,876 | * 9/1993 | Kerstens et al. | 250/561 |
| 5,428,475 | * 6/1995 | Tanaami et al. | 359/368 |
| 5,737,084 | * 4/1998 | Ishihara | 356/376 |

* cited by examiner

Primary Examiner—Cassandra Spyrou
Assistant Examiner—Mark A. Robinson
(74) Attorney, Agent, or Firm—Moonray Kojima

(57) ABSTRACT

A confocal system comprising a laser light source; a confocal scanner that emits an output light beam from the light source after passing through apertures; an optical microscope that focuses light passed through the apertures onto a sample; a detector that obtains cross sectional images of the sample by photographing the return light reflected from the sample; and a controller that determines focal positions of the sample using light intensity at cross sectional images based on a focal position light intensity characteristic, whereby focal postions and three dimensional shape of the sample is obtained without scanning in the direction of the optical axis.

10 Claims, 6 Drawing Sheets

CONFOCAL SYSTEM

BACKGROUND OF THE INVENTION

1. Field of Invention

This invention relates to a confocal system, and more particularly to such system which does not require scanning in the direction of the optical axis.

2. Description of the Prior Art

Conventional confocal systems provide confocal images in the following manner. A disk having a plurality of apertures is rotated. A sample is scanned by focusing thereon light beam which is passed through the apertures. A three dimensional shape of the sample, based on cross sectional images, is obtained by scanning the sample a plurality of times in the optical axis direction.

FIG. 1 shows a conventional confocal system comprising a light source 1, a confocal scanner 2, an optical microscope 3, a stage 4 on which a sample is placed, a detector 5, such as a camera, and a controller 6, such as a computer. Output light from the laser 1 is made incident on the confocal scanner 2 through an optical fiber or the like. Scanner 2 rotates a disk having a plurality of apertures therein and passes the laser light beam through the apertures. Optical microscope 3 focuses the light beam outputted from confocal scanner 2 onto a sample (not shown) placed on stage 4. Stage 4 drives the sample in the direction of the optical axis of the incident light. Furthermore, detector 5 is provided in confocal scanner 2 and an output signal from detector 5 is supplied to controller 6.

Operation of the system of FIG. 1 is as follows. Light beam is focused on the sample by optical microscope 3 after passing through the apertures of the disk of scanner 2. The sample reflects the light and the reflected (or otherwise called "return") light is again passed through the apertures of the scanner disk and is made incident on detector 5. The images obtained by detector 5 are confocal images. Since the disk is rotated, the spot of light focused on the sample scans the sample surface. Detector 5 then obtains cross sectional images of the sample on planes perpendicular to the direction of the optical axis.

A three dimensional image of the sample can be determined by storing the multiple cross sectional images obtained of the sample by scanning the sample in the direction of the optical axis by controlling stage 4, and then by reconstructing the cross sectional images. These procedures are performed in the controller 6.

That is, a three dimensional shape can be derived by storing a plurality of cross sectional images in planes perpendicular to the direction of the optical axis while scanning the sample in the direction of the optical axis by controlling stage 4 and by reconstructing the cross sectional images using controller 6.

However, in the confocal system of FIG. 1, a long measuring time is required to obtain one three dimensional image because scanning is done by utilizing stage 4 and in the optical axis direction to obtain the plurality of cross sectional images. Thus, if the conventional system is used, for example in factory automation, semiconductor production lines, etc, the length of measuring time presents a difficult problem. Also, another problem is that stage 4 must be provided separately and the accuracy of measurement then depends solely on the driving accuracy of the stage.

SUMMARY OF THE INVENTION

Accordingly, an object of the invention is to overcome the aforementioned and other deficiencies, disadvantages, problems and drawbacks of the prior art.

Another object is to provide a confocal system that can obtain focal positions of the sample and a three dimensional shape thereof without scanning in the direction of the optical axis.

DETAILED DESCRIPTION OF THE PREFERRED EMBODIMENTS

Figure 1:
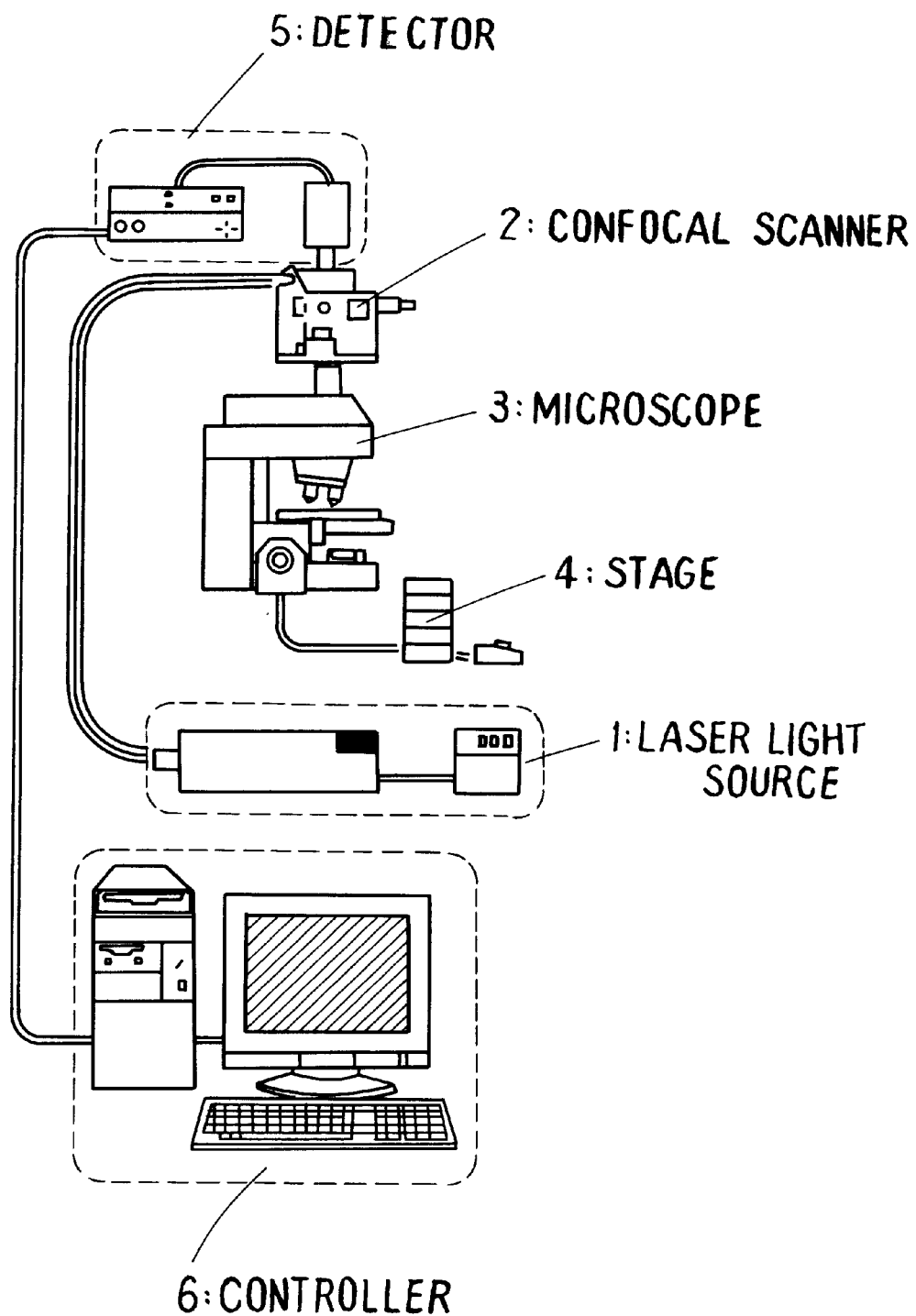
FIG. 1 is a block diagram depicting a conventional confocal system.
Figure 2:
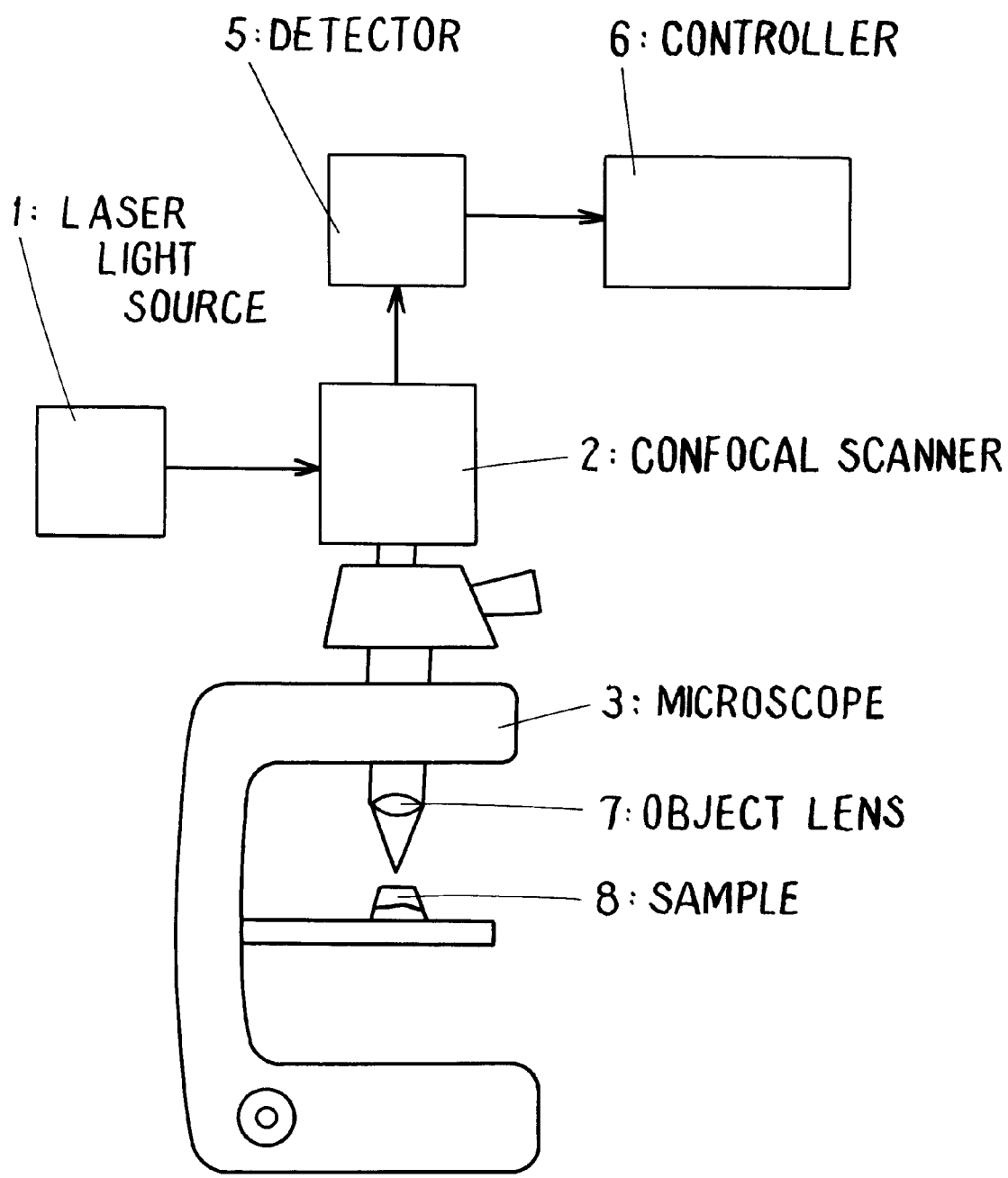
FIG. 2 is a block diagram depicting an illustrative embodiment of the invention.

In FIG. 2, the same symbols are used for the same components as in FIG. 1 and description thereof is omitted for sake of convenience except where relevant. The output light beam from laser light source 1 is made incident on confocal scanner 2 using an optical fiber or the like. Confocal scanner 2 rotates a disk having a plurality of apertures therein and provides an incident laser light beam after the light beam is passed through the apertures. Optical microscope 3 focuses the outputted light beam onto sample 8 using objective lens 7. Also, detector 5, such as a camera, is provided in or connected to confocal scanner 2, and the output signal from detector 5 is supplied to controller 6.

Figure 3:
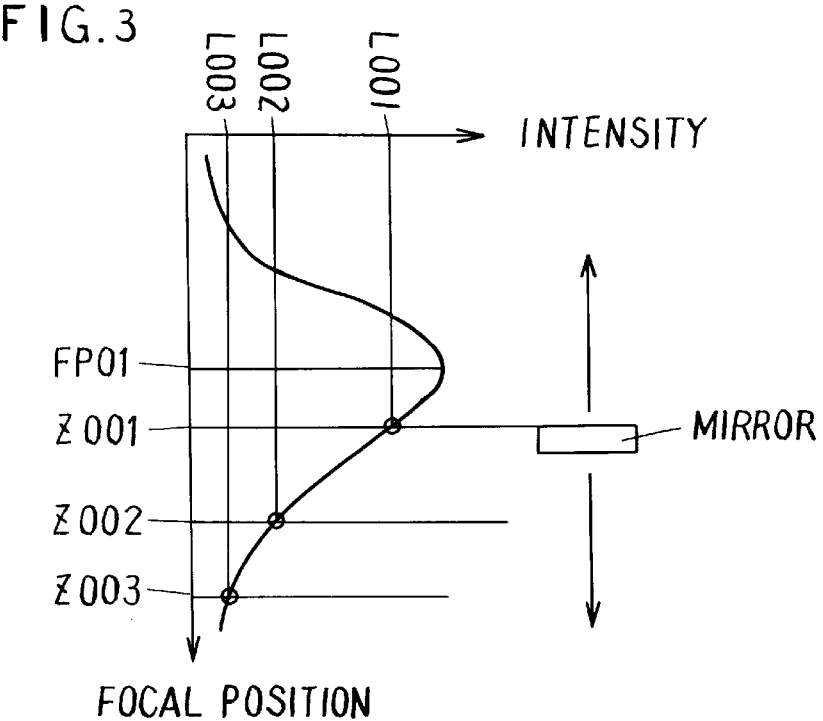
FIG. 3 is a graph depicting a characteristic curve showing the relationship between light intensity and focal point position obtained with the detector when a mirror is scanned in the optical axis direction.
Figure 4:
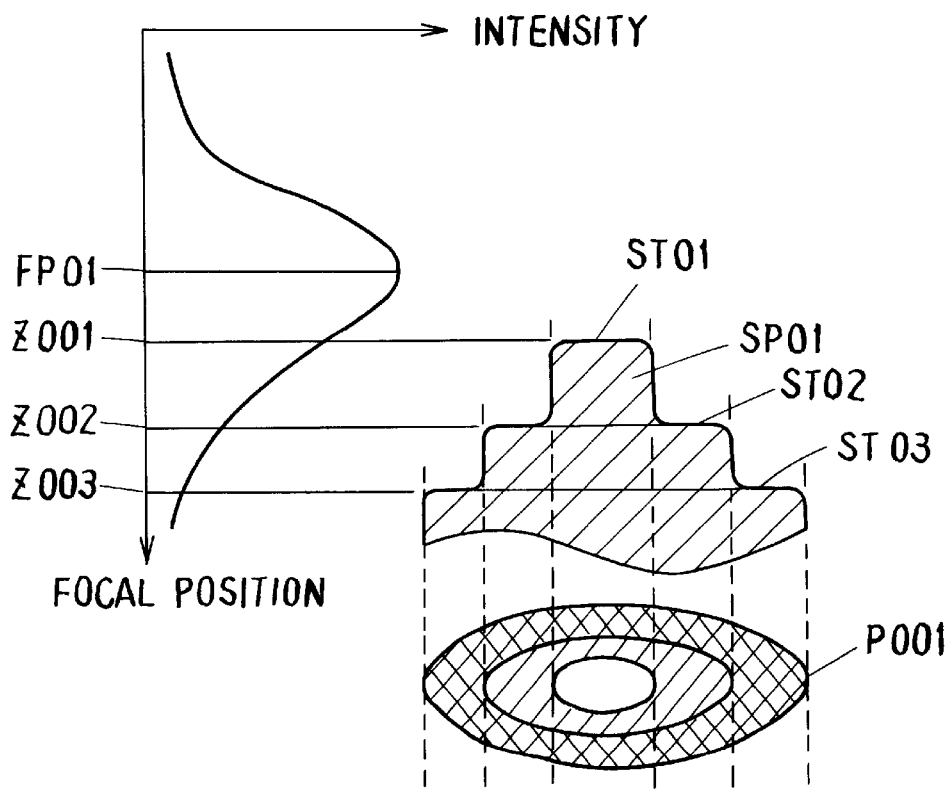
FIG. 4 is an illustration depicting the relationship between the characteristic curve of FIG. 3 and the sample.

The embodiment operates as follows, taken in connection with FIGS. 3 and 4. FIG. 3 shows a characteristic curve showing the relationship between light intensity and focal point position obtained by detector 5 when a mirror is scanned in the direction of the optical axis in place of a sample. FIG. 4 shows the relationship between the characteristic curve of FIG. 3 and the sample. Description of the basic operational steps is omitted hereat since such operation is similar to that described with reference to FIG. 1.

In detector 5, the maximum light intensity is obtained when the mirror is positioned at the focal point and the light intensity is caused to decrease before and after the focal point. In other words, as shown in FIG. 3, the maximum light intensity can be obtained at the focal point, shown as FP01. The light intensity becomes lower in turn, as shown by L001, L002, and L003 in FIG. 3, as the mirror is moved to turn away from the focal point, as shown by Z001, Z002 and Z003. Accordingly, such focal point position light intensity characteristic is measured and stored in advance in controller 6.

On the other hand, as shown in FIG. 4, assume a sample 8 that has stepwise planes ST01, ST02, and ST03 disposed perpendicular to the direction of the optical axis, as shown as SP01. Also, assume that the reflectivity of each plane is 100%, that is the same value as that of the mirror. Assume further that the positions of the planes, shown by ST01, ST02, and ST03 in FIG. 4, of the sample, shown as SP01 in FIG. 4, are equal to the focal point positions shown by Z001, Z002 and Z003 in FIG. 3, respectively.

If the cross sectional image of the sample, as shown by SP01 in FIG. 4, in the relative positions described above, is photographed with detector 5, the cross sectional image shown as P001 in FIG. 4, for example, is obtained. In the cross sectional image, shown as P001 in FIG. 4, the positions of the planes indicated by ST01, ST02, and ST03 in FIG. 4, are equal in focal point positions, shown by Z001, Z002 and Z003, in FIG. 3. Thus, in the cross sectional images described above, the light intensity at the portions of the planes, shown as STO1, ST02, and ST03 in FIG. 4, is represented by L001, L002, and L003, of FIG. 3.

In this case, controller 6 analyzes the light intensity of the cross sectional image obtained by detector 5, based on the stored characteristic of the focal point position light intensity. If the light intensity if L001, the focal point position is determined to be Z001. On the other hand, if the light intensity is determined to be L002 or L003, the focal point position is determined to be Z002 or Z003, respectively. Controller 6 also reconstructs the three dimensional shape of the sample based on the foregoing positional information and displays or applies other operations to the sample images.

As a result, focal point positions of the sample can be obtained without scanning the sample in the direction of the optical axis and the three dimensional shape of the sample can be readily determined, based on the focal point positions, by analyzing the light intensity at the cross sectional images obtained with detector 5, based on the focal point position light intensity characteristic, using the controller 6 to achieve the foregoing steps.

However, the shape of the actual samples is not the preferable shape, as shown by SP01 in FIG. 4, but may have slopes, and the like, and the reflectivity of the samples in not usually 100%, but varies depending on the positions, in many cases. Operations in such a case will be described with reference to FIGS. 5 and 6.

Figure 5:
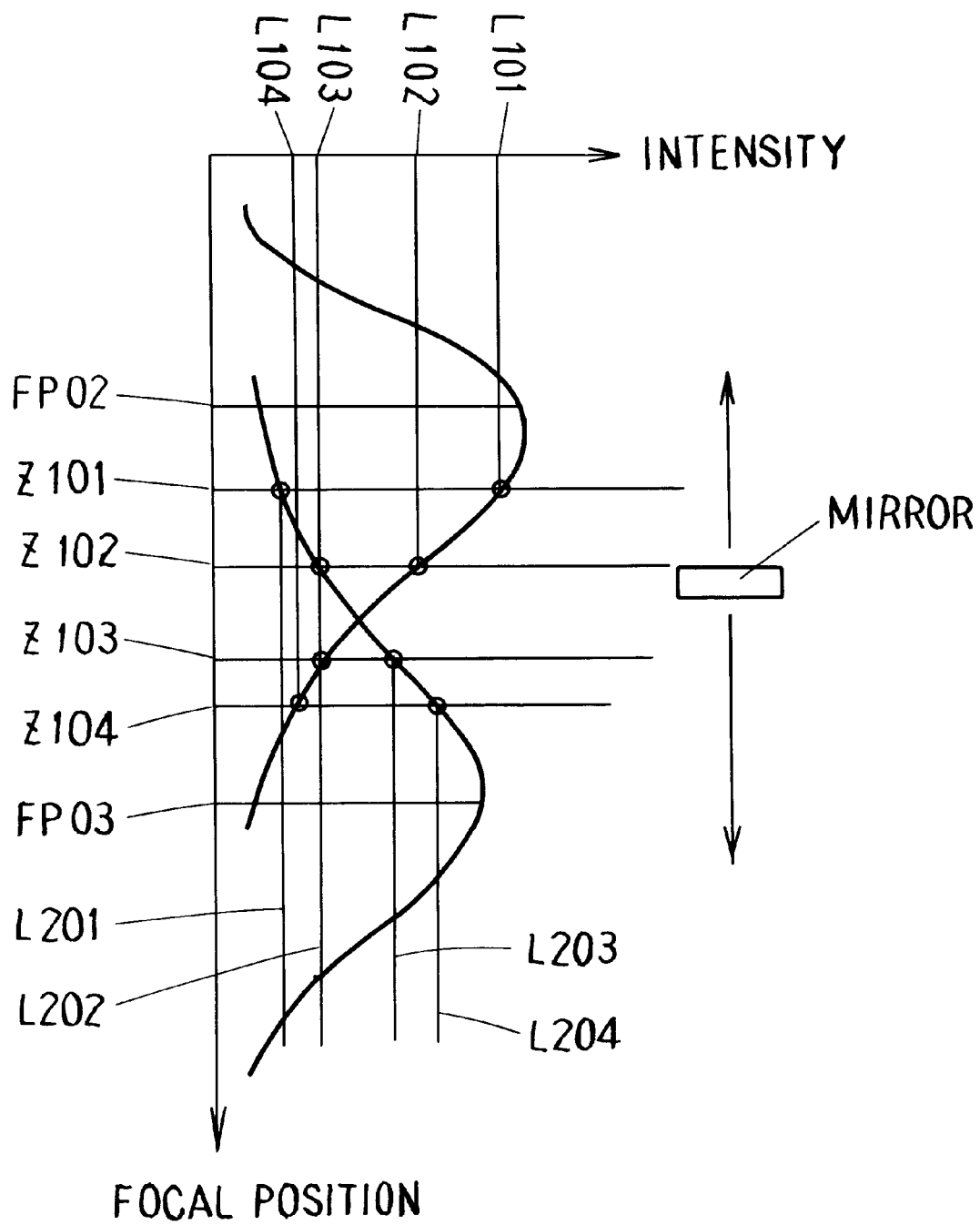
FIG. 5 is a graph depicting a characteristic curve showing the relationship between the light intensity and the focal point position obtained with the detector when a mirror is scanned in the optical axis direction.

FIG. 5 shows a characteristic curve of the relationship between light intensity and focal point position obtained with detector 5, when a mirror is scanned in the direction of the optical axis in place of the sample. FIG. 6 shows the relationship between the characteristic curve of FIG. 5 and the sample.

Two types of focal point position light intensity characteristics obtained for two focal point positions, shown as FP02 and FP03 in FIG. 5, are measured in advance and stored in controller 6. For example, assume that, if a focal point position is FP02, the light intensity is represented by L101, L102, L103 and L104 in the focal point positions Z101, Z102, Z103 and Z104, respectively. Also, assume that, if the focal point position is FP03, the light intensity would be represented by L201, L202, L203 and L204 in the focal point positions of Z101, Z102, Z103, and Z104, respectively.

A cross sectional image is obtained at the focal point position FP02, and another cross sectional image is obtained at the focal point position FP03 by detector 5, and the respective images are inputted to controller 6, for processing.

Figure 6A:
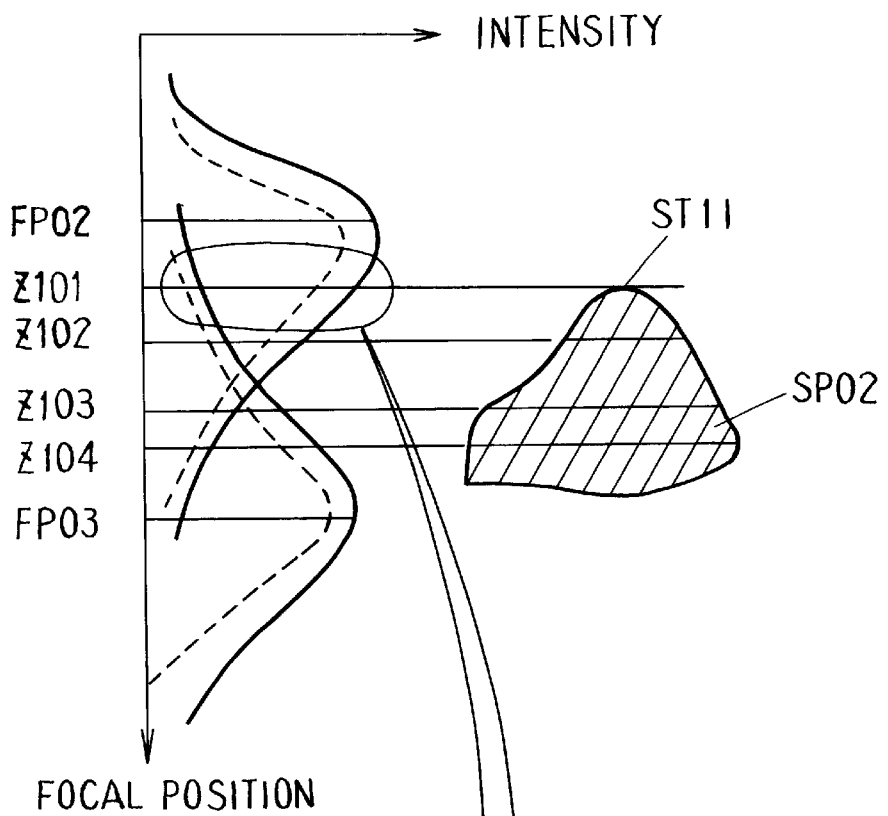
FIGS. 6(A) and 6(B) are illustrations depicting the relationship between the characteristic curve of FIG. 5 and the sample.
Figure 6B:
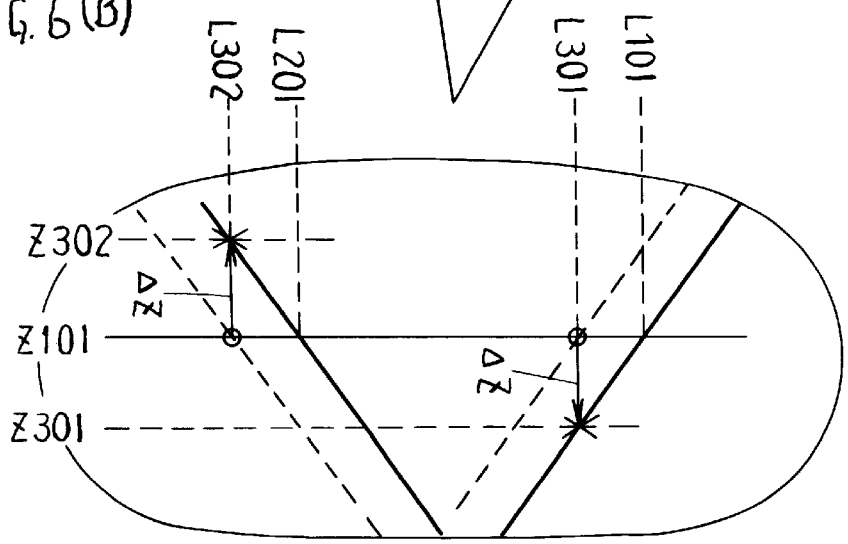

For example, assume that sample 8 has a shape, such as shown by SP02 and the apex of the sample is as shown by ST11 in FIGS. 6(A) and 6(B), and is located in the focal point position of Z101. Then, the light intensity at the cross sectional images for the focal point positions of FP02 and FP03 should be represented by L101 and L201, respectively, provided that the reflectivity of the sample, shown by SP02 in FIG. 6(A), is 100%. However, since reflectivity is actually low, the characteristics of the focal point light intensity provide the curves shown by the broken lines in FIG. 6(A). Thus, even if the focal point position is Z101, as shown by the enlarged drawing in FIG. 6(B), the light intensity at the cross sectional images for the focal point positions of FP02 and FP03 is decreased to L301 and L302, respectively.

The focal point position light intensity characteristic for the reflectivity of 100% is stored in controller 6. Thus, the focal point positions for the light intensity of L301 and L302 are erroneously determined to be Z301 and Z302, respectively, as different positions from the actual focal point positions, as seen in the enlarged drawing in FIG. 6(B).

However, both errors are changes in the opposite direction to each other. If it is assumed that the absolute values of the slopes of both broken lines in the enlarged drawing in FIG. 6(B) are equal, the error "ΔZ" mutually becomes equal and the following equations hold:

$$Z301 = Z101 + \Delta Z \quad (1)$$

$$Z302 = Z101 - \Delta Z \quad (2)$$

Accordingly, by adding equation (1) to equation (2) and dividing the result by 2, expression (3) is obtained:

$$\frac{(Z101 + \Delta Z + Z101 - \Delta Z)}{2} = \frac{2(Z101)}{2} = Z101 \quad (3)$$

Thus, the error component can be corrected.

Since the focal point position light intensity characteristic is generally a nonlinear function, it cannot be corrected simply as shown by expression (3). However, correction can be implemented through computing and processing by providing a correction table or by setting an approximation expression in the controller 6. That is, three dimensional shapes can be obtained even for samples that have slopes and other shapes and the reflectivity thereof varies depending on the positions thereof.

Accordingly, the focal point positions of the sample can be obtained without scanning in the direction of the optical axis even if the sample has an ordinary shape. The foregoing process is performed by analyzing light intensity for two types of cross sectional images in different focal point positions acquired by detector 5 based on two types of focal point position light intensity characteristics for different focal point positions in controller 6. Three dimensional shapes can also be obtained based on the focal point positions.

In addition, the thickness of sample 8 can be measured up to approximately full width at half maximum of the focal point position light intensity characteristic curve, as shown in FIG. 3. For example, let the magnification of objective lens 7 be one-fold, the diameter of the apertures in confocal scanner 2 be 50 μm, then the full width at half maximum described above is calculated to be about 1 mm.

If an image is a dynamic image, such as a gear, or the like, moving in the optical direction, the position of the gear, or like, can be obtained based on a predetermined focal point position light intensity characteristic because the light intensity varies with the focal point position.

In order to obtain two cross sectional imaged which are different in focal point position, the focal point position may be changed by moving a lens or the stage of the optical microscope 3. The configuration, as shown in FIG. 7 may be used.

Figure 7:
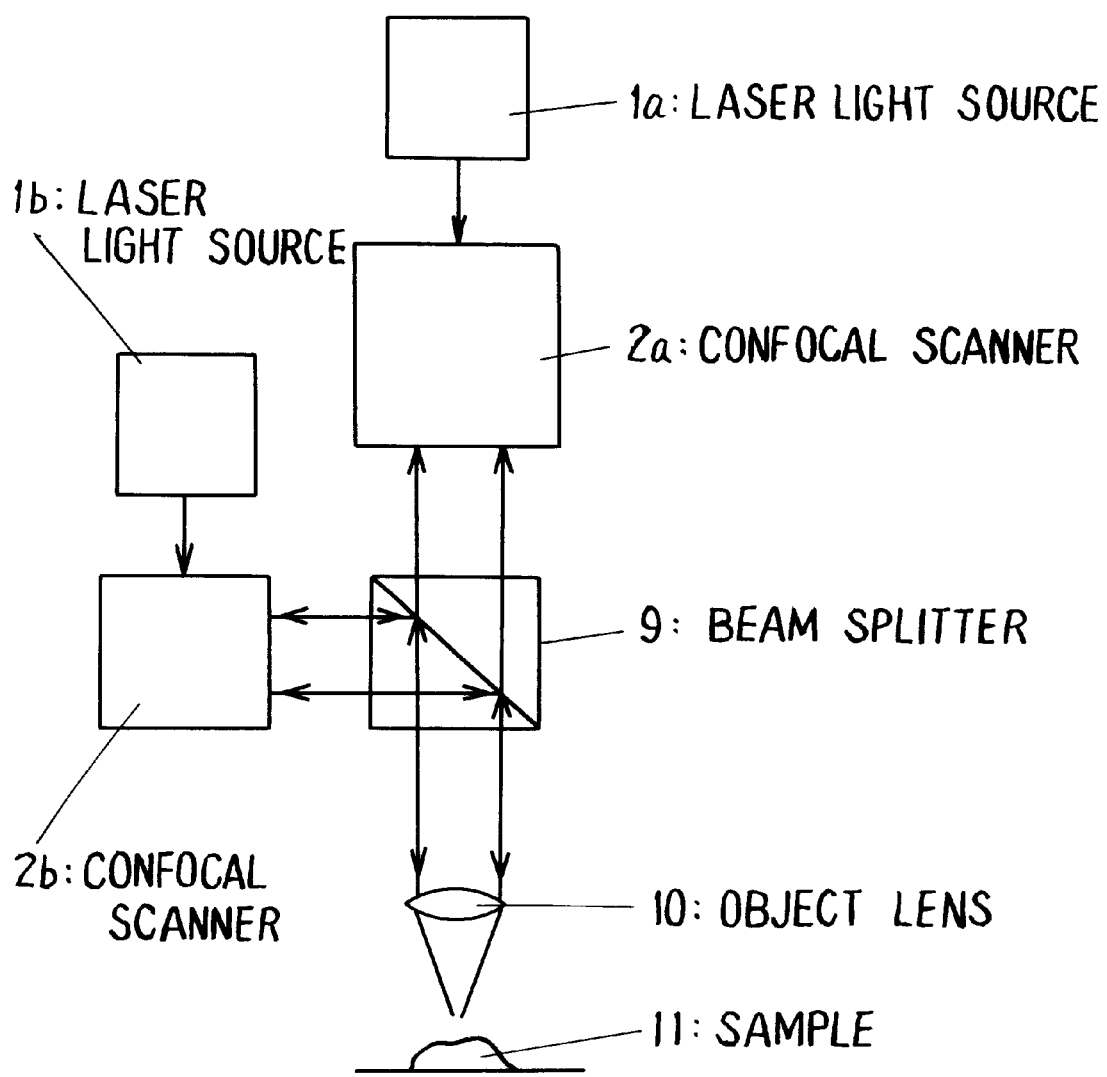
FIG. 7 is a block diagram depicting another illustrative embodiment of the invention using two light sources.

In FIG. 7, the system comprises laser light sources 1a, 1b; confocal scanners 2a, 2b; a beam splitter 9; and objective lens 10; and a sample 11. In addition, beam splitter 9 and objective lens 10 comprise a part of optical microscope 3, while detector 5 and controller 6 are omitted hereat for simplicity of description.

By combining the output light beams from two confocal scanners 2a and 2b, that have different focal point positions, through beam splitter 9 and by making the polarizing directions, the measuring wavelengths, or the measuring times different from each other, two cross sectional images for different focal point positions can be obtained using each detector, not shown.

For example, if a polarizing beam splitter is used as beam splitter 9, and the polarizing direction of confocal scanners 2a, 2b is selected to be "0 degree" and "90 degree" respectively, the light beams having the polarizing directions of "0 degree" and "90 degree" of the return or reflected beam from sample 11, are made to be incident on confocal scanners 2a and 2b. Thus, two cross sectional images for different focal point positions are obtained by each detector, not shown.

Also, for example, if a dichroic mirror is used as a beam splitter 9 and the wavelengths of the output light beams from the confocal scanners 2a and 2b are made different from each other, two cross sectional images having different focal point positions can be obtained similar to the foregoing description. In this case, the different focal point positions of FP02 and FP03 can also be realized by utilizing the chromatic aberrations of the objective lens.

Moreover, for example, if the measuring time is shifted in such a manner as , after obtaining a cross sectional image using confocal scanner 2a, measuring another cross sectional image using confocal scanner 2b, two cross sectional images having different focal point positions can be obtained.

Also, in FIG. 7, although two laser light sources 1a and 1b are shown, the output light beam from one laser light source can be divided into two branches to supply the two beams to confocal scanners 2a, and 2b.

In addition, in FIGS. 5 and 6, the three dimensional shape is obtained by determining two types of focal point position light intensity characteristic for different focal point positions, and by measuring two cross sectional images having different focal point positions. However, three or more cross sectional images can also be used to obtain more accurate three dimensional shapes.

Furthermore, the confocal scanner can be of the scan type confocal scanner that rotates a disk having a plurality of apertures therein and outputs the incident laser light beam after passing the beam through the apertures. However, the scanner can also be of the X-Y direction scan-less type confocal scanner, such as disclosed in Japanese Patent Application SN Hei09-009991 (1997) and Hei09-125481 (1997). In other words, the scanning method used in the invention wherein scanning is in planes perpendicular to the direction of the optical axis is not limited to that disclosed and other methods and apparatus can be used.

Focal point positions of a sample can be obtained without scanning in the direction of the optical axis by taking a configuration, as mentioned in the invention, and by analyzing the light intensity at the cross sectional image obtained by the detector based on the focal point position light intensity characteristic, using a controller.

Moreover, focal point positions of a sample having even an ordinary shape can also be obtained without scanning in the direction of the optical axis by analyzing with the controller the light intensity at two types of cross sectional images in different focal point positions obtained by the detector based on two types of focal point position light intensity characteristic for different focal point positions.

The foregoing two types of cross sectional images in different focal point positions can be obtained by changing the focal point positions by moving the stage or the lens of the optical microscope.

The two types of cross sectional images in different focal point positions can also be obtained by combining the output light beams from two confocal scanners having different focal point positions with a beam splitter and by making the polarizing directions of the output light beams from the two confocal scanners different from each other.

The two types of cross sectional images in different focal point positions can also be obtained by combining the output light beams from two confocal scanners having different focal point positions with a beam splitter and by making the measured wavelengths of the output light beams from the two confocal scanners different from each other.

The two types of cross sectional images in different focal point positions can also be obtained by combining the output light beams from two confocal scanners having different focal point positions with a beam splitter and by making the measuring time of the output light beams from the two confocal scanners different from each other.

In addition, the three dimensional shape of the sample can be obtained without scanning in the optical axis direction by determining the three dimensional shape of the sample based on the focal point positions of the sample obtained by teh controller.

Furthermore, he scanning mehtod for the planes perpendicular to the optical axis direction becomes unlimited by using a scanning type or an X-Y direction scan-less type of confocal scanner.

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. In a confocal system comprising:

a laser light source;

a confocal scanner having a plurality of apertures through which output light beam from said laser light source is passed;

an optical microscope to focus output light beam through said apertures onto a sample;

detector means for obtaining a cross sectional image of said sample by photographing light beams reflected by said sample; and controller means for determining focal positions of said sample using light intensity at said cross sectional image based on a focal position light intensity characteristic, the improvement comprising:

said controller means comprises:

means for storing at least one characteristic curve representing light intensity characteristic points as measured against focal position points of the surface of said sample;

means for receiving signals from said detector means representing the light intensity characteristic of said surface of said sample; and means for processing the signal from the detector means in terms of the stored characteristic curve to determine the cross sectional image of the sample;

whereby the shape of the sample is measured without necessity of moving the focus along the focus direction of measurement.

2. The system of claim 1, wherein said controller means determines focal positions of said sample using light intensity at two cross sectional images for different focal point positions obtained by said detector means.

3. The system of claim 2, wherein said two cross sectional images are obtained by moving a stage or a lens of said optical microscope.

4. The system of claim 2, wherein said two types of cross sectional images are obtained by combining output light beams passed through two confocal scanners with a beam splitter and concurrently producing different polarizing directions of the output light beams passed through said two confocal scanners.

5. The system of claim 2, wherein said two types of cross sectional images are obtained by combining output light beams passed through two confocal scanners with a beam splitter and concurrently producing different measured wavelengths of the output light beams passed through the two confocal scanners.

6. The system of claim 2, wherein said two types of cross sectional images are obtained by combining output light beams passed through two confocal scanners in one set or two sets with a beam splitter and concurrently changing measuring time of the output light beams passed through said two confocal scanners to be different from each other.

7. The system of claim 2, wherein said controller means comprises means for determining three dimensional shape of said sample based on focal point positions as stored by said controller means.

8. The system of claim 1, wherein said controller means comprises means for determining three dimensional shape of said sample based on focal point positions of said sample.

9. The system of claim 1, wherein said confocal scanner is a scanning type or X-Y direction scan-less type confocal scanner.

10. A measuring method using a confocal system comprising:

a laser light source;

a confocal scanner having a plurality of apertures through which output light beam from said laser light source is passed;

an optical microscope to focus output light beam through said apertures onto a sample;

detector means for obtaining a cross sectional image of said sample by photographing light beams reflected by said sample; and controller means for determining focal positions of said sample using light intensity at said cross sectional image based on a focal position light intensity characteristic, said method comprising the steps of:

storing at least one characteristic curve representing light intensity characteristic points as measured against focal position points of the surface of said sample;

receiving signals from said detector means representing the light intensity characteristic of said surface of said sample; and processing the signal from the detector means in terms of the stored characteristic curve to determine the cross sectional image of the sample; whereby the shape of the sample is measured without necessity of moving the focus along the focus direction of measurement.

* * * * *